US007717592B2

(12) United States Patent
Tyll et al.

(10) Patent No.: US 7,717,592 B2
(45) Date of Patent: May 18, 2010

(54) VEHICLE LIGHTING SYSTEM AND METHOD

(75) Inventors: Paul Tyll, Farmington Hills, MI (US); Jason Nantais, Farmington Hills, MI (US); Chris Prisby, Farmington Hills, MI (US); Tom Schumacher, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 23 days.

(21) Appl. No.: 11/737,364

(22) Filed: Apr. 19, 2007

(65) Prior Publication Data

US 2008/0259618 A1  Oct. 23, 2008

(51) Int. Cl.
*B60Q 1/00* (2006.01)
*F21V 21/28* (2006.01)

(52) U.S. Cl. .............. 362/464; 362/479; 362/490; 362/459; 362/475; 362/507; 362/487; 362/493

(58) Field of Classification Search ............ 362/464, 362/459, 475, 479, 487, 490, 493, 507
See application file for complete search history.

(56) References Cited

U.S. PATENT DOCUMENTS

| 6,037,867 A * | 3/2000 | Joseph et al. ............ 340/508 |
| 6,452,488 B1 * | 9/2002 | He et al. ................. 340/468 |
| 2006/0170537 A1 * | 8/2006 | Marriott ............. 340/426.24 |

OTHER PUBLICATIONS

Owner's Manual, pp. 109-111, published before 2007.
Photograph dated Oct. 27, 2006.

* cited by examiner

*Primary Examiner*—Sandra L O'Shea
*Assistant Examiner*—Jessica L McMillan
(74) *Attorney, Agent, or Firm*—Young Basile

(57) ABSTRACT

An exterior auxiliary lighting system is provided including a light source for generating a beam of visible light, the light source having an aperture through which the beam of light is projected. A cover can be detachably connected to the light source to overlay at least a portion of the aperture. A sensor is provided for detecting whether the cover is attached to the light source. A switch responsive to an output signal from the sensor is adapted to selectively decouple the light source from a power supply when the sensor detects that the cover is attached to the light source.

20 Claims, 6 Drawing Sheets

ORL OPERATION MATRIX

KEY IN IGNITION POSITION AND COVERS OFF (DEACTIVATION SWITCH IN OPEN STATE)

|  | HIGH BEAMS OFF → HIGH BEAMS ON → HIGH BEAMS OFF | | |
|---|---|---|---|
| COCKPIT OFF | OFF | OFF | OFF |
| PUSH COCKPIT TO ON | OFF | ON* | OFF |

* COCKPIT INDICATOR LIGHT ALSO COMES ON

KEY IN IGNITION POSITION AND COVERS ON (DEACTIVATION SWITCH IN CLOSED STATE)

|  | HIGH BEAMS OFF → HIGH BEAMS ON → HIGH BEAMS OFF | | |
|---|---|---|---|
| COCKPIT OFF | OFF | OFF | OFF |
| PUSH COCKPIT TO ON | OFF | OFF | OFF |

KEY IN IGNITION POSITION AND COVERS OFF (DEACTIVATION SWITCH IN OPEN STATE)

|  | HIGH BEAMS OFF → HIGH BEAMS ON → HIGH BEAMS OFF | | |
|---|---|---|---|
| COCKPIT OFF | OFF | OFF | OFF |
| PUSH COCKPIT TO ON | OFF | OFF | OFF |

KEY IN IGNITION POSITION AND COVER ON (DEACTIVATION SWITCH IN CLOSED STATE)

|  | HIGH BEAMS OFF → HIGH BEAMS ON → HIGH BEAMS OFF | | |
|---|---|---|---|
| COCKPIT OFF | OFF | OFF | OFF |
| PUSH COCKPIT TO ON | OFF | OFF | OFF |

FIG. 5

VEHICLE LIGHTING SYSTEM AND METHOD

FIELD OF THE INVENTION

The present invention relates generally to a vehicle auxiliary light, and more particularly, to a switch for preventing the auxiliary light from being operated when conditions for operation are not met.

BACKGROUND

Automotive vehicles, such as light trucks and sport utility vehicles, commonly include various types of auxiliary lights, such as fog lights and off-road utility lights. Off-road lights are typically mounted to the front or roof of a vehicle, whereas fog lights are generally mounted to the lower front region of the vehicle. In addition to providing light, fog and off-road utility lights are considered decorative with respect to the vehicle. Auxiliary lights are available as an aftermarket accessory and as original equipment on certain model vehicles.

Various regulations, such as California Vehicle Code §24499-24411 govern the use of off-road lights. Many states, for example, require auxiliary lights to be physically capped when the vehicle is operated on public streets. Regulations also require that auxiliary lights not be operated on public streets.

Capping auxiliary lights when not in use is also desirable because it protects the light from being damaged by debris, such as stones, that can be kicked up from the road. However, it is desirable that auxiliary lights not be operated with the cap installed. Certain high powered lights, particularly off-road utility lights, can generate significant heat when operated. If the auxiliary light were operated with the cap installed, the heat could damage the cap. It has generally been left up to the user to ensure that the cap is removed prior to operating the auxiliary light. This creates a risk that the user will inadvertently fail to remove the cap prior to activating the auxiliary light. It has also generally been left up to the user to ensure that the cap is replaced prior to operating the vehicle on public roads. This creates a risk that the user will inadvertently fail to replace the cap and will operate the vehicle in a manner not fully complying with applicable regulations.

SUMMARY

A vehicle lighting system is provided that includes a light mounted to the vehicle; a cover removably attached to the light; a sensor adapted to detect when the cover is attached to the light; and a switch. The switch is adapted to disconnect the light from a power supply when the first sensor detects that the cover is attached to the light.

In some embodiments, a light assembly is provided for use in a vehicle. The light assembly includes a housing with a lamp disposed therein; and a cap removably attached to the housing and including signal emitter.

In other embodiments, a method is provided for operating an auxiliary vehicle light that is adapted to receive a removable protective cap. The method includes detecting when the cap is attached to the auxiliary vehicle light; and deactivating the auxiliary light when a cap is attached thereto.

BRIEF DESCRIPTION OF THE DRAWINGS

The description herein makes reference to the accompanying drawings, wherein like reference numerals refer to like parts throughout the several views, and wherein:

FIG. 5 is a state table illustrating the operation of the embodiment of FIG. 3.

DETAILED DESCRIPTION

Other applications of the present invention will become apparent to those skilled in the art when the following description of the best mode contemplated; for practicing the invention is read in conjunction with the accompanying drawings. The following description of the embodiment(s) is merely exemplary in nature and is in no way intended to limit the invention, its application, or uses.

To avoid damaging the caps that are used on auxiliary lights, it is desirable to develop a device that can disable the utility light to prevent it from being operated when the cap is installed on the light. It is also desirable to prevent drivers from operating vehicles on public roads when auxiliary lights are not capped.

Figure 1:
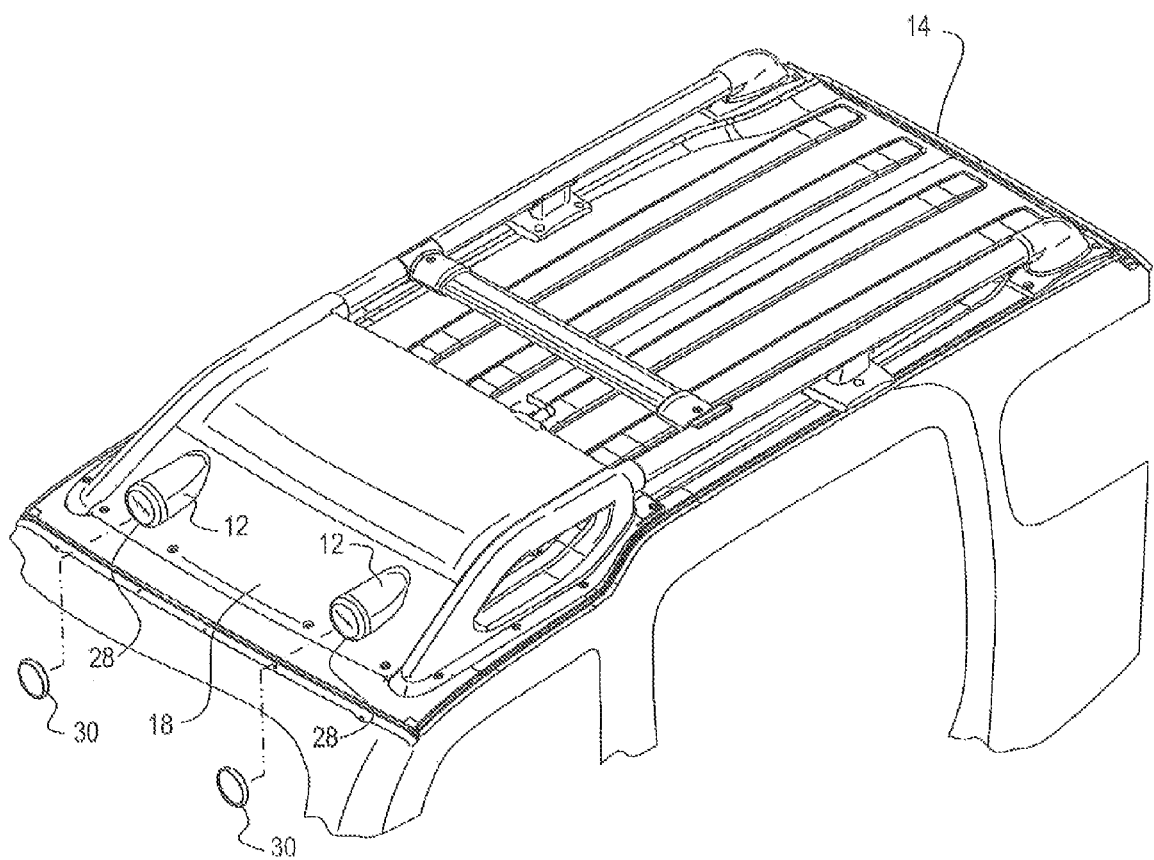
FIG. 1 is fragmentary top perspective view of a vehicle showing a pair of auxiliary lights mounted to a roof of the vehicle.

Referring to FIG. 1, an auxiliary lighting system 10 is shown to have at least one auxiliary light 12 for generating a beam of visible light. Auxiliary light 12 can be mounted to a vehicle 14 at various locations depending on the lighting requirement of the particular application. Off-road utility lights, for example, can be mounted to a roof 16 of tire vehicle, as shown in FIG. 1, for casting visible radiant light in a direction forward of the vehicle to illuminate objects in front of the vehicle. Auxiliary light 12 can alternatively be mounted on the vehicle another suitable location. For esthetic, as well as performance reasons, it can be desirable to integrate auxiliary light 12 with the vehicle's surrounding exterior structure. For example, the auxiliary Sight can be integrated with an air deflector 18 to produce a custom look to meet consumer styling preferences, while at the same time minimizing the turbulence and wind noise created by air flowing over the auxiliary light.

Figure 2:
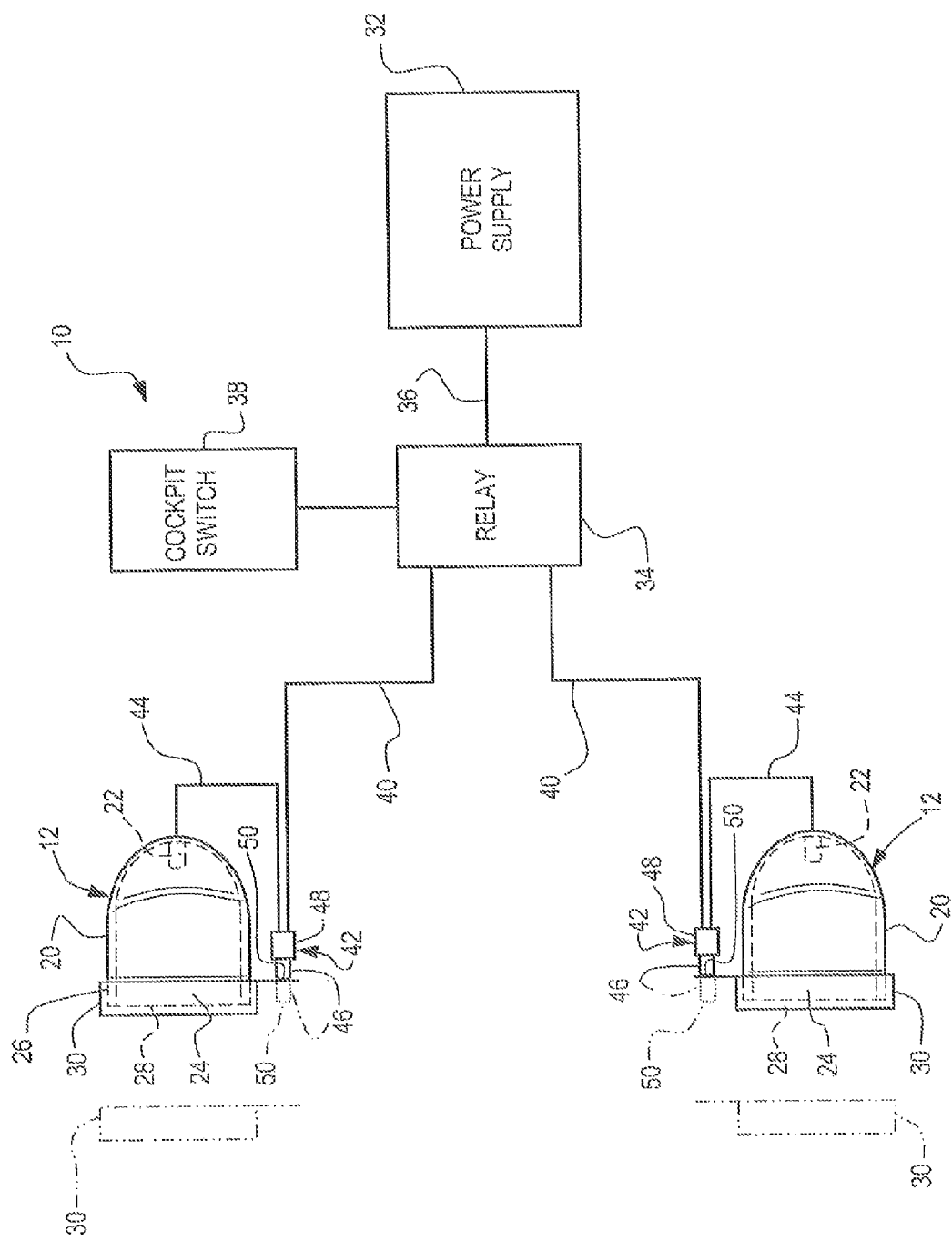
FIG. 2 a schematic diagram of a first embodiment a vehicle lighting system.

Referring to FIG. 2, auxiliary light 12 can include a housing 20 for enclosing a lamp 22. Applying art electric current, to lamp 22 causes the lamp to generate a beam of visible radiant light. Lamp 22 can include various devices for producing visible radiant light, including but not limited to, an incandescent lamp, a xenon lamp, and a halogen lamp.

Radiant visible light produced by lamp 22 can exit housing 20 through an aperture 24 defined in a forward end 26 of housing 20. A lens 28 for focusing and directing the radiant light can be positioned within the aperture 24. An outer circumference of lens 28 can be suitably attached to housing 20 to prevent water, dirt, and other environmental contaminants from entering the housing.

Figure 3:
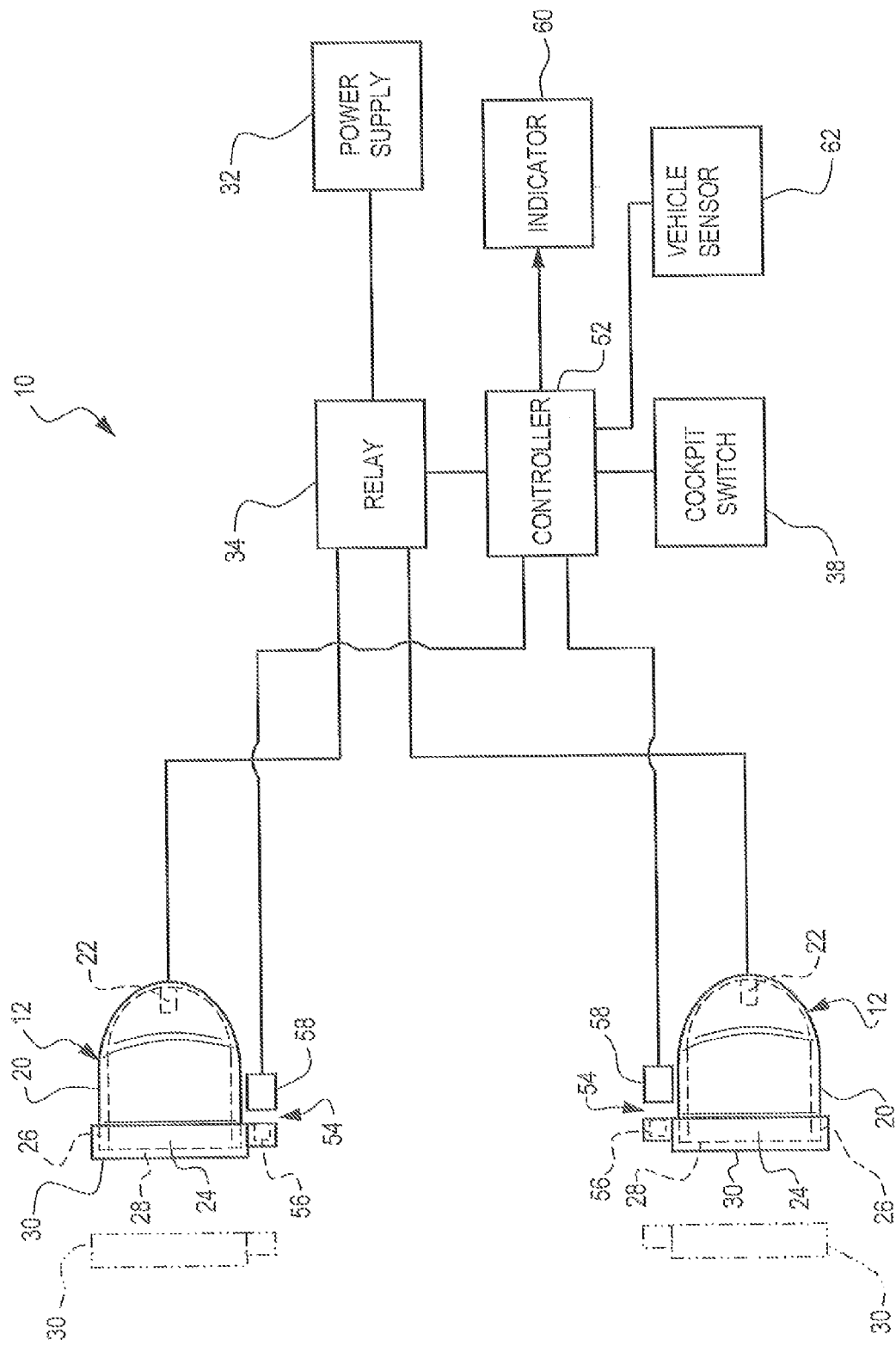
FIG. 3 is schematic diagram of a second embodiment of a vehicle lighting system.

Auxiliary light 12 can include a cap 30 that detachably engages front portion 26 of housing 20. Cap 30 can protect the auxiliary light from damage caused by stones and other debris that can be kicked up form the road. Cap 30 can also be required to comply with various regulations requiring auxiliary lights, such as off-road utility lights, to be capped when operating the vehicle on a public road. Cap 30 overlays at least a portion of aperture 24, and can be removed from housing 20 (the detached cap is shown in phantom in FIGS. 2 and 3) prior to activating lamp 22. Although a simple, genetically configured cap 30 is depicted in FIGS. 2 and 3, it shall nevertheless be appreciated that the cap can have a wide variety of other configurations depending on the stylistic and functional requirements of the particular application.

Electric current for operating lamp 22 can be supplied by a power supply 32, which can be electrically connected to lamp 22. Power supply 32 can include, without limitation, an alternator, generator, battery, fuel cell, or any other similar device capable of generating electric current and can be controlled by the placing the vehicle key to the ING position for example. The flow of electrical current from power supply 32 to lamp 22 can be further controlled by a relay 34 electrically connected to power supply 32 by means of an electrical conductor 36. Operation of relay 34 can be controlled by means of a cockpit switch 38 located within a passenger compartment of vehicle 14 and accessible to a vehicle operator. Cockpit switch 38 can be a toggle, button, or other suitable type of user-actuated control that can generate a signal to activate and deactivate auxiliary lights 12. A second conductor 40 can connect relay 34 to a switch 42, which is responsive to a sensor (in this case a plunger 46 as described below) to break the electrical connection between power supply 32 and lamp 22 when cap 30 is attached to auxiliary light 12. A third conductor 44 can electrically connect switch 42 to lamp 22.

Switch 42 can included any of a variety of mechanical and electronic switches operable to selectively open and close the electrical circuit between power supply 32 and lamp 22. One non-limiting example of mechanical switch can include a plunger 46, which extends from a switch housing 48. As explained below, a plunger 46 operates as a sensor to detect the presence of cap 30 on housing 28.

Plunger 46 can be slid axially along its axis within housing 48, between and extended position (depicted in phantom in FIG. 2) and a depressed position, thereby functioning as a sensor for detecting the presence of cap 30 on housing 28. Plunger 46 is preferably biased toward the extended position. Positioning plunger 46 in the extended position closes the electrical circuit between relay 34 and lamp 22, thereby allowing electric current to flow from power supply 32 and tamp 22 when the auxiliary light is activated. Conversely, depressing plunger 46 opens the electrical circuit between relay 34 and lamp 22, thereby preventing electric current from flowing between power supply 32 and lamp 22 when relay 34 is operated to activate the auxiliary light.

An end 50 of plunger 46 engages Cap 30 when the cap is attached to auxiliary light 12. Attaching cap 30 to auxiliary light 12 depresses plunger 46 and opens the electrical circuit between power supply 32 and lamp 22, thereby preventing electric current from flowing between the two components so that lamp 22 is not illuminated when the auxiliary light 12 is activated. Removing cap 30 from auxiliary light 12 releases plunger 46 and closes the electrical circuit between power supply 32 and lamp 22, thereby allowing electric current to pass between the two components and thus illuminate lamp 22 when auxiliary light 12 is activated. Persons skilled in the art will appreciate that this is merely one example of the wide variety of mechanical switches that can be employed with the present invention, and that various other types of mechanical and electronic switches can be satisfactorily employed.

Referring to FIG. 3, auxiliary light system 10 can include a controller 52 for controlling operation of relay 34 in response to various input signals received by the controller. The operation of controller 52 as described below can be performed in one processor or if desired distributed among more than one processor. For ease of illustration, the disclosed embodiment shows the controller functions in a single processor. Although controller 52 and relay 34 are shown as separate components in FIG. 3, it is contemplated that the two devices can nevertheless be combined as a single device.

Controller 52 can receive a signal from cockpit switch 38 signaling that the vehicle operator has actuated cockpit switch 38 to activate auxiliary lights 12. Cockpit switch 38 can be located within the vehicle passenger compartment so as to be accessible by the vehicle operator.

Controller 52 can be adapted to receive a signal from a sensor 54 operable for detecting whether cap 30 is attached to auxiliary light 12. A non-limiting example of one such sensor is a Hall effect sensor having a circuit that can vary its output voltage in response to changes in magnetic field density. A Hall effect sensor can be employed in the present invention by attaching a magnetic 56 to cap 30. A circuit 58 capable of sensing the magnetic field density of magnet 56 can be located so as to be positioned adjacent the magnet 56 when the cap is attached to auxiliary light 12. The output voltage of circuit 58 will vary depending on whether cap 30 is attached to auxiliary light 12 and this output voltage can be transmitted to controller 52 as an output signal of sensor 54 indicative of the presence of cap 30 on light 12. Alternatively, cap 30 can include a different type of signal emitter, such as an RFID chip.

Controller 52 will either enable of disable activation of lamp 22 depending on whether the output signal of sensor 54 indicates that cap 30 is attached to auxiliary light 12. For example, in response to a signal received from cockpit switch 38 indicating that auxiliary lights 12 have been activated, if the output of sensor 54 indicates that cap 30 is not attached to auxiliary light 12, then controller 52 can send a signal to relay 34 causing relay 34 to close the electrical circuit between power supply 32 and lamp 22 and thus power lamp 22. If on the other hand, controller 52 determines from the output of sensor 54 that cap 30 is attached to auxiliary light 12, then controller 52 causes relay 34 to remain open, and thus disable operation of lamp 22 by interrupting the supply of power to lamp 22, even though the controller has received a signal from cockpit switch 38 to activate auxiliary light 12. Thus, once the cockpit switch 38 is activated, controller 52 will allow auxiliary light 12 to be activated if receives a signal from sensor 54 indicating that the cap has been removed. It will be appreciated that controller 52 and relay 34 act in combination as a switch to control auxiliary light 12.

Controller 52 can also, if desired, enable and disable lamp 22 in response to an signal received from a vehicle sensor 62. Vehicle sensor 62 detects a predetermined condition of the vehicle. Even in cap 30 is removed from auxiliary light 12 and even if the operator of the vehicle has actuated cockpit switch 38 to turn on auxiliary light, controller 52 can cause relay 34 to remain open to prevent power from reaching lamp 22 if the output of vehicle sensor 62 indicates the existence of one or more predetermined conditions. Examples of such conditions can include, the high beams lights are off, the vehicle speed exceeds a predetermined threshold (such, as 25-45 mph), the vehicle key is not in the ING position, whether the vehicle is operating in two-wheel drive, the vehicle is operating on a public road, oncoming headlights are detected, or the amount of ambient light outside the vehicle exceeds a predetermined threshold. Each of these exemplary conditions is indicative of a circumstance in which auxiliary lights 12 should not be operated. Vehicle sensor 62 can detect one or more of these or other suitable conditions. It will be appreciated that although vehicle sensor 62 and sensor 54 are shown as separate components, the two sensors could be integrated into a single physical component, and references herein to "first" and "second" are hereby defined to cover this as well as the more typical deployment where the sensors 54 and 62 would be in separate components.

For example, if the vehicle speed exceeds a predetermined threshold (such as 25-45 mph) or if the vehicle is in two-wheel drive, the vehicle is probably not in an environment where off-road lighting is appropriate. If ambient light is detected above a predetermined level or if the light of oncoming vehicles is detected, the auxiliary lighting system can be disabled by opening relay 34 based on the assumption that the lights are not required or appropriate in daylight or if there are oncoming vehicles.

Whether the vehicle is operating on a road can be detected by a number of methods. For example, sensor 62 can track the vehicle's location using a GPS unit (not shown), which in conjunction with a geographic database (not shown) determines if the vehicle is on a public road. Alternatively, a vision recognition system can be used to detect the markers of a road (such as curbs, lane dividers and the movement of oncoming traffic). Alternatively, a rate indicator cart be used to detect the whether the vehicle in a straight line for a predetermined distance or on even terrain indicative of pavement. Each of these methods individually or in combination with others can be used to determine whether the vehicle is on a public road. For example, if it can be judged that a vehicle is on the public roads if it travels in a straight line for a predetermined distance (such as 100 to 200 yards) at a speed of over 25-45 mph. Other suitable criteria can be selected for establishing that the vehicle is on a public road.

A cap warning indicator 60 for notifying the vehicle operator that cap 30 is attached to auxiliary light 12 can be provided. Warning indicator 60 can be suitably located within the passenger compartment of the vehicle. Warning indicator 60 can be operably connected to controller 52 and configured to emit an audible or visual warning signal notifying the vehicle operator that cap 30 is attached to auxiliary light 12 in response to a signal received from controller 52. In an alternative embodiment, controller 52 can activate warning indicator 60 when auxiliary light 12 is on and cap 30 is detected without disabling the operation of auxiliary light 12 (that is, without opening relay 34).

In alternative embodiments, cap warning indicator 60 can have two warning modes, one mode indicating that the cap is on when auxiliary light 12 is in operation, and the second mode indicating that the cap is off when the vehicle is on public roads. Controller 52 can cause warning indicator 60 to indicate the first warning mode in response to sensor 54 indicating the presence of cap 30. Controller 52 can cause warning indicator 60 to indicate the second warning mode in response to sensor 54 indicating the absence of cap 30 and vehicle sensor 62 indicating that the vehicle is operating on a public road (as described above).

Figure 4:
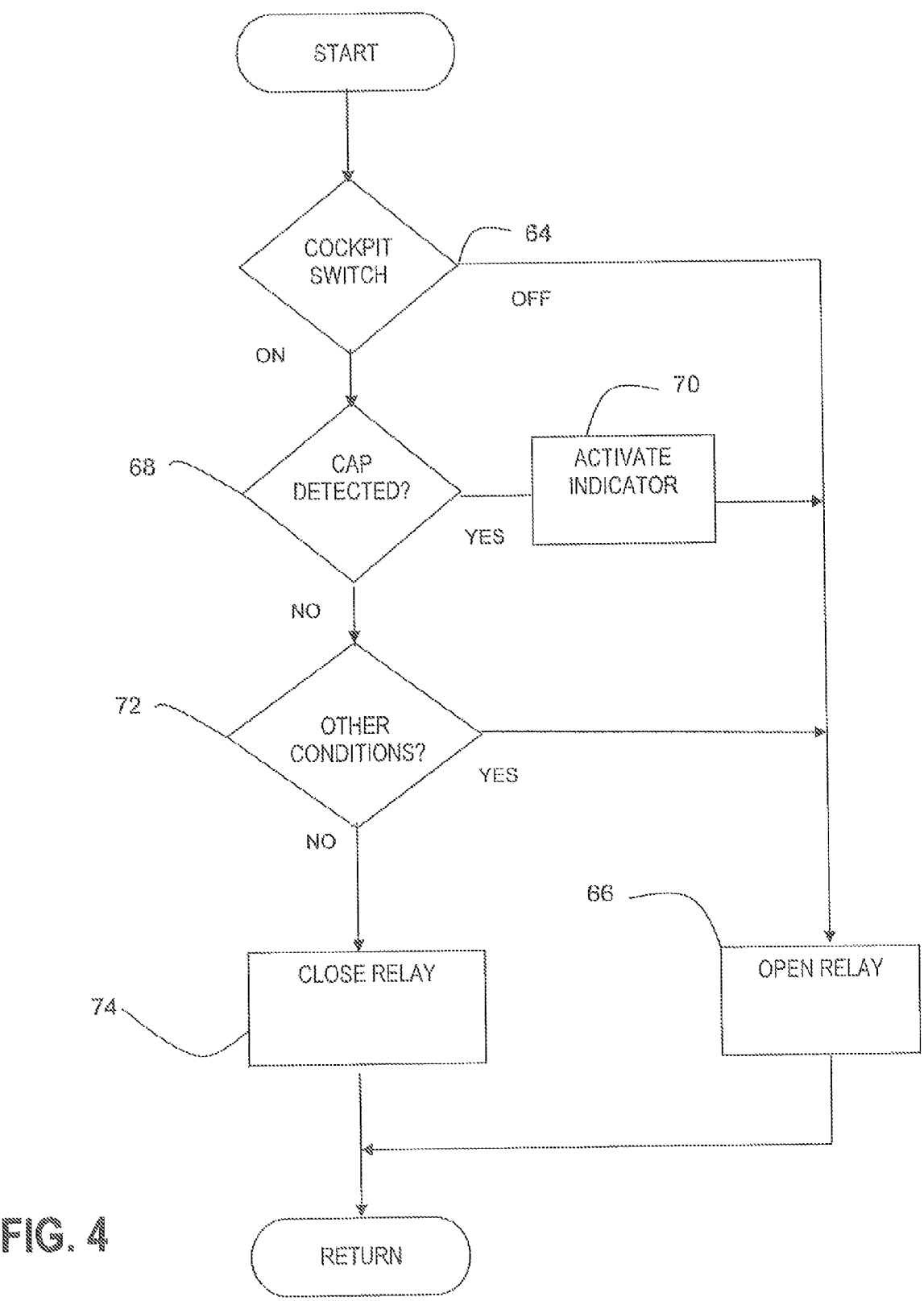
FIG. 4 is a flow chart illustrating the operation of the embodiment of FIG. 3.

Referring to FIG. 4, the operation of the embodiment of FIG. 3 is illustrated. Control initiates at decision block 64, where a controller 52 determines whether the signal received from cockpit switch 38 indicates that the vehicle operator has actuated cockpit switch 38 to turn on auxiliary lights 12. If cockpit switch 38 has not been actuated, control moves to block 66 where controller 52 causes relay 34 to remain open (thus cutting off power to auxiliary lights 12). If cockpit switch 38 has been actuated, then control moves to block 68, where controller 52 determines whether the signal received from sensors 54 is indicative of cap 30 being detected on either of lights 12. If cap 30 is detected, then control moves to block 70, where controller 52 causes indicator 60 to indicate a that cap 30 is detected. Control then moves to block 64 where controller 52 causes relay 34 to remain open (thus cutting off power to auxiliary lights 12). If cap 30 is not detected, then control moves to block 72.

At block 72, controller 52 determines whether the input signal received form vehicle sensor 62 is indicative of other vehicle conditions that require auxiliary light 12 to be disabled. If any of these other vehicle conditions are met, then control moves to block 64, where controller 52 causes relay 34 to remain open (thus cutting off power to auxiliary lights 12). If other vehicle conditions are met, then control moves to block 74, where controller 52 causes relay 34 to close, thus providing power to auxiliary lights 12. Controller 52 can repeat the operations FIG. 4 periodically.

Another condition to permit activation of auxiliary lights 12 is the vehicle key being in the ING position. This can provide power to power supply 32 and sensor 54 so that no power is provided to auxiliary lights 12 if key is not in the ING position, regardless of whether the user actuates cockpit switch 38. The state table of FIG. 5 illustrates operation of auxiliary lights 12 in relation to the stole of the key being in the ING position.

Figure 6:
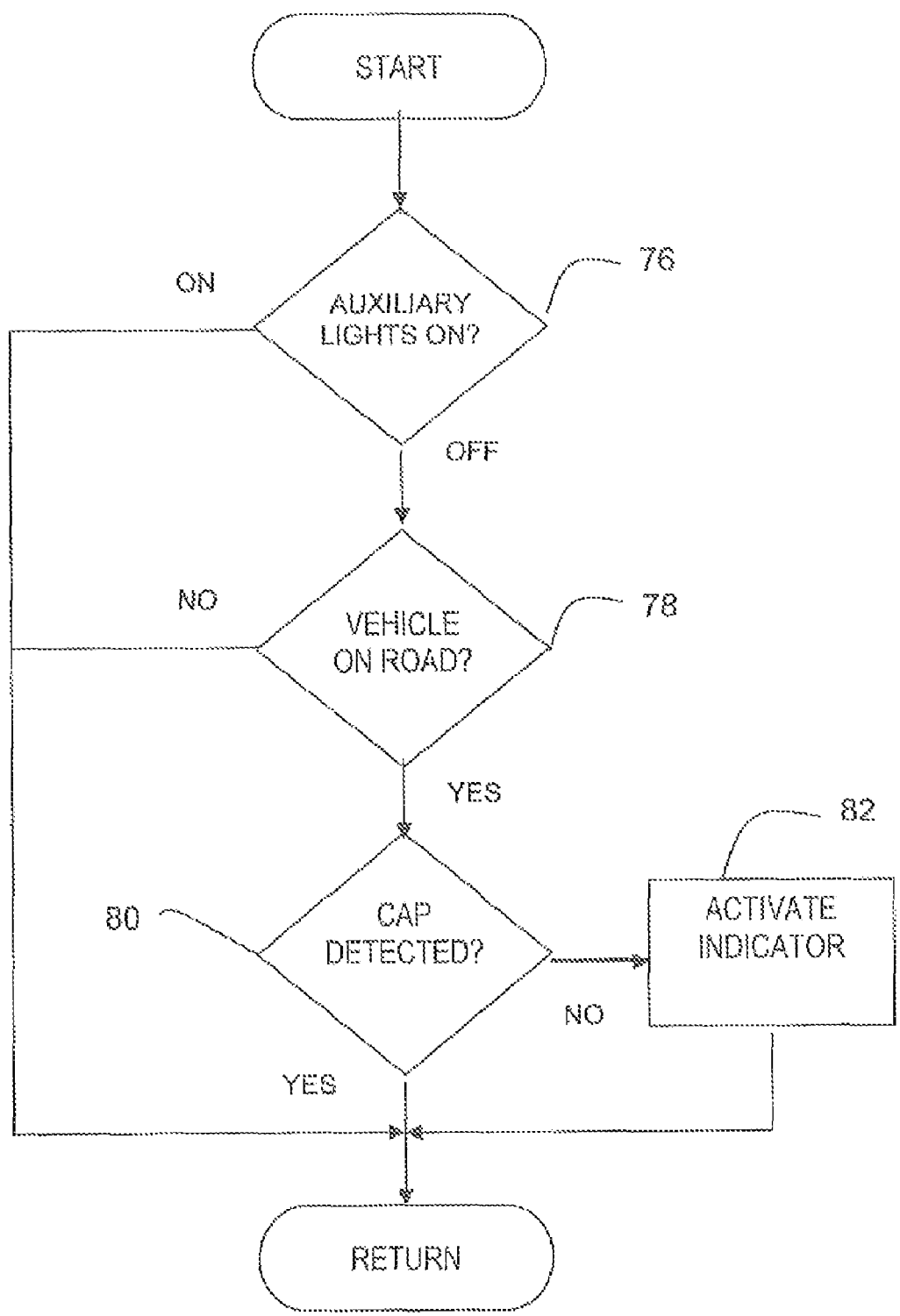
FIG. 6 is a flow chart further illustrating the operation of the embodiment of FIG. 3.

Referring to FIG. 6, controller 52 can also activate indictor 60 to alert the driver when, one of caps 30 is removed from one of the auxiliary lights 12 while the vehicle is operating on a public road or if the vehicle is operating with the cockpit switch positioned to turn auxiliary lights 12 off. Beginning at block 76, controller 52 determines if the auxiliary lights 12 are on (that is, relay 34 is closed). If the auxiliary lights 12 are on, then processing occurs periodically as described in FIG. 4. If the auxiliary lights 12 are off then control moves to a block 78, where controller 52 determines whether the signal received form vehicle sensor 62 is indicative of the vehicle being on the public road. Techniques for making this determination are described above, and one or more criteria can be applied to judge that vehicle 14 is on a public road. If the signal received from sensor 62 indicates that vehicle 14 is not on a road, then processing terminates. Otherwise, if the signal received from sensor 62 indicates that vehicle 14 is on a public road, then control moves to block 80, where controller 52 determines whether the signal received from sensors 54 is indicative of cap 30 being detected on either of auxiliary lights 12. If caps 30 are detected on both auxiliary lights 12, then processing terminates. If caps 30 are not detected on both auxiliary lights 12, then control moves to a block 82, where controller 52 activates indicator 82 to warn the operator that caps 30 are removed while vehicle is on a public road. Such warning may be audible or visual or both.

Alternatively, controller 52 can activate indicator 82 to warn the operator that caps 30 are removed if the cockpit switch is positioned to turn off auxiliary lights and the signal received from sensors 54 is indicative of cap 30 being removed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle lighting system for a vehicle including a power supply, the vehicle lighting system comprising:
   a light mounted to the vehicle and arranged to illuminate an area including a path of forward travel of the vehicle;
   an opaque cover removably attached to the light;
   a first sensor adapted to detect when the cover is attached to the light;
   a user-actuated control mounted in a cockpit of the vehicle and selectively manipulatable between an activated mode and a deactivated mode; and
   an electric circuit including a switch adapted to disconnect the light from the power supply when the user-actuated control is in the deactivated mode and a switch operatively coupled to the first sensor and adapted to disconnect the light from the power supply when the first sensor detects that the cover is attached to the light even if the user-actuated control is in the activated mode.

2. The vehicle lighting system of claim 1, wherein the cover includes a magnet and the first sensor is adapted to detect the presence of the magnet.

3. The vehicle lighting system of claim 1, wherein the first sensor includes a toggle that engages the cover when the cover is attached to the light, wherein the toggle is operatively connected to the switch that is coupled to the first sensor to disconnect the light from the power supply when the toggle is not engaged by the cover.

4. The vehicle lighting system of claim 1 further comprising a second sensor adapted to detect the existence of at least one predetermined vehicle condition, wherein the electric circuit includes a controller in communication with the second sensor that is adapted to disconnect the light from the power supply when the second sensor indicates that the at least one predetermined vehicle condition exists.

5. The vehicle lighting system of claim 1, wherein the first sensor is adapted to detect when the cover is removed from the light, and wherein the electric circuit includes a controller that is adapted to connect the light to the power supply in response to the user-actuated control being in the activated mode when first sensor detects that the cover is removed from the light but not when the first sensor detects that the cover is attached to the light.

6. The vehicle lighting system of claim 5 further comprising a warning indicator in the cockpit of the vehicle operable to emit at least one of an audible warning and a visual warning, and wherein the controller is further adapted to activate the warning indicator when the first sensor detects that the cover is removed from the light and the user-actuated control is in the deactivated mode.

7. The vehicle lighting system of claim 6, wherein the controller is further adapted to activate the warning indicator when the first sensor detects that the cover is removed from the light and the second sensor detects that the vehicle is operating on a road.

8. A vehicle lighting system for a vehicle including a power supply, the vehicle lighting system comprising:
    a light mounted to the vehicle;
    a cover removably attached to the light;
    a first sensor adapted to detect when the cover is attached to the light;
    a user-actuated control mounted in a cockpit of the vehicle and selectively manipulatable between an activated mode and a deactivated mode; and
    a controller in communication with each of the first sensor and the user-actuated control that is adapted to connect the light to the power supply when the first sensor detects that the cover is detached to the light and the user-actuated control is in the activated mode.

9. The vehicle lighting system of claim 8 further comprising a warning indicator in the cockpit of the vehicle, wherein the controller is further adapted to activate the warning indicator in response to the user-actuated control being in the activated mode when the first sensor detects that the cover is attached to the light.

10. The vehicle lighting system of claim 9, wherein the warning indicator emits at least one of an audible warning and a visual warning.

11. A light assembly for use with a vehicle, comprising:
    a housing including a lamp disposed therein; and
    an opaque cap removably attached to the housing and including an emitter of signal.

12. The light assembly of claim 11, wherein the emitted signal is a magnetic field.

13. The light assembly of claim 11, further comprising:
    a sensor associated with the housing and responsive to the emitted signal to detect when the cap is attached to the housing; and
    a switch responsive to the sensor and operative to disable operation of the lamp when the sensor detects that the cap is attached to the housing.

14. The light assembly of claim 13, further comprising:
    a warning indicator responsive to the sensor and operative to generate a warning in a cockpit of the vehicle when the sensor detects that the cap is attached to the housing.

15. The light assembly of claim 11, further comprising:
    a first sensor associated with the housing and responsive to the emitted signal to detect when the cap is removed from the housing;
    a second sensor adapted to detect when the vehicle is operated on a road; and
    a warning indicator responsive to the first and second sensors and operative to generate a warning when the cap is removed from the housing and the vehicle is operated on a road.

16. A method for operating an auxiliary vehicle light that is adapted to receive a removable protective cap, comprising:
    detecting when the cap is attached to the auxiliary vehicle light;
    detecting whether a user-actuated control selectively manipulatable between an activated mode and a deactivated mode is in the activated mode or the deactivated mode;
    deactivating the auxiliary light when a cap is attached thereto regardless of whether the user-actuated control is in the activated mode or the deactivated mode; and
    activating the auxiliary light when the cap is detected as being detached from the vehicle and the user-actuated control is in the activated mode.

17. The method of claim 16, further comprising:
    generating a warning in a cockpit of the vehicle by activating a warning indicator when the cap is detected to be attached to the auxiliary vehicle light.

18. The method of claim 16, wherein detecting when the cap is attached to the auxiliary vehicle light further comprises:
    detecting the existence of a magnetic field associated with the cap.

19. The method of clam 16, wherein detecting when the cap is attached to the auxiliary vehicle light further comprises:
    providing a plunger switch in proximity to the auxiliary vehicle light so that switch is actuated when the cap is attached to the auxiliary vehicle light.

20. The method of claim 16, further comprising:
    detecting when the vehicle is operating on a road;
    detecting when the cap removed from the auxiliary vehicle light; and
    activating a warning indicator when the cap is removed from the auxiliary vehicle light and the vehicle is operating on a road.

* * * * *